United States Patent
Zhang et al.

(10) Patent No.: US 7,782,378 B2
(45) Date of Patent: Aug. 24, 2010

(54) SCENE-BASED NON-UNIFORMITY CORRECTION METHOD USING LOCAL CONSTANT STATISTICS

(75) Inventors: Chao Zhang, Belle Mead, NJ (US); Wenyi Zhao, Mountain View, CA (US)

(73) Assignee: Sarnoff Corporation, Princeton, NJ (US)

( * ) Notice: Subject to any disclaimer, the term of this patent is extended or adjusted under 35 U.S.C. 154(b) by 202 days.

(21) Appl. No.: 11/869,968

(22) Filed: Oct. 10, 2007

(65) Prior Publication Data
US 2008/0278607 A1 Nov. 13, 2008

Related U.S. Application Data

(60) Provisional application No. 60/852,178, filed on Oct. 17, 2006.

(51) Int. Cl.
*H04N 5/217* (2006.01)
(52) U.S. Cl. ........................ 348/241; 348/243; 348/246; 348/247
(58) Field of Classification Search ........................ None
See application file for complete search history.

(56) References Cited

U.S. PATENT DOCUMENTS

| 6,549,651 B2 * | 4/2003 | Xiong et al. ................. 382/154 |
| 6,681,058 B1 * | 1/2004 | Hanna et al. ................. 382/294 |
| 2007/0242900 A1 * | 10/2007 | Chen et al. .................. 382/294 |

OTHER PUBLICATIONS

M. Irani, S. Peleg, "Motion Analysis for Image Enhancement: Resolution, Occlusion, and Transparency," Journal of Visual. Comm. and Image Repre., vol. 4, pp. 324-335 (1993).

* cited by examiner

*Primary Examiner*—Yogesh K Aggarwal
(74) *Attorney, Agent, or Firm*—Lowenstein Sandler PC (57) ABSTRACT

A scene-based non-uniformity correction method employing local constant statistics for eliminating fixed pattern noise in a video comprising a plurality of images is disclosed, comprising the steps of providing an initial gain image, an initial offset image, a predetermined pyramid level, and a filter of a predetermined level; setting one of the plurality of input images to the current image; calculating a temporary true scene image for the current image based on the initial gain image and the initial offset image; accumulating a temporal mean image and a temporal standard deviation image based on the calculated temporary true scene image; setting another of the plurality of images to the current image and repeating the setting, calculating, and accumulating steps until substantially all of the images of the plurality of images have been processed, otherwise further perform the steps of calculating a Gaussian mean image based on the accumulated temporal mean and calculating a Gaussian gain image based on the accumulated temporal standard deviation image; spectrum shaping the Gaussian mean image and the Gaussian gain image based on the predetermined pyramid level and the filter of a predetermined level; multiplying the spectrum shaped Gaussian gain image by the initial gain image to obtain a final gain image; and multiplying the spectrum shaped Gaussian mean image by the initial gain image and add the initial offset image to obtain a final offset image.

24 Claims, 5 Drawing Sheets

Update and Display:

Initial:

FIG. 5

Update and Display:

SCENE-BASED NON-UNIFORMITY CORRECTION METHOD USING LOCAL CONSTANT STATISTICS

CROSS-REFERENCE TO RELATED APPLICATIONS

This application claims the benefit of U.S. provisional patent application No. 60/852,178 filed Oct. 17, 2006, the disclosure of which is incorporated herein by reference in its entirety.

FIELD OF THE INVENTION

The present invention relates to vision systems. More specifically, the present invention relates to a scene-based non-uniformity correction method employing local constant statistics for eliminating fixed pattern noise in video sequences produced by solid state imagers, such as focal-plane arrays (FPA), in digital video cameras.

BACKGROUND OF THE INVENTION

Focal plane array (FPA) sensors are widely used in visible-light and infrared imaging systems. More particularly, FPA's have been widely used in military applications, environmental monitoring, scientific instrumentation, and medical imaging applications due to their sensitivity and the low cost. Most recently research has focused on embedding powerful image/signal processing capabilities into FPA sensors. An FPA sensor comprises a two-dimensional array of photodetectors placed in the focal plane of an imaging lens. Individual detectors within the array may perform well, but the overall performance of the array is strongly affected by the lack of uniformity in the responses of all the detectors taken together. The non-uniformity of the responses of the overall array is especially severe for infrared FPA's.

From a signal processing perspective, this non-uniformity problem can be restated as how to automatically remove fixed-pattern noise at each pixel location. The FPA sensors are modeled as having fixed (or static) pattern noise superimposed on a true (i.e., noise free) image. The fixed pattern noise is attributed to spatial non-uniformity in the photo-response (i.e., the conversion of photons to electrons) of individual detectors in an array of pixels which constitute the FPA. The response is generally characterized by a linear model:

$$z_t(x,y) = g_t(x,y) \cdot s_t(x,y) + b_t(x,y) + N(x,y), \quad (1)$$

where $N(x,y)$ is the random noise, $z_t(x,y)$ is the observed scene value for a pixel at position $(x,y)$ in an array of pixels (image) that are modeled as being arranged in a rectangular coordinate grid $(x,y)$ at time $t$, $s_t(x,y)$ is the true scene value (e.g., irradiance collected by the detector) at time $t$, $g_t(x,y)$ is the gain of a pixel at position $(x,y)$ and time $t$, and $b_t(x,y)$ is the offset of a pixel at position $(x,y)$ at time $t$. $g_t(x,y)$ can also refer to as a gain image associated with noise affecting the array of pixels, and $b(x,y)$ the offset image of pixels associated with noise added to the pixels. The task of non-uniformity correction (NUC) algorithms is to obtain $s_t(x,y)$ via estimating the parameters $g(x,y)$ and $b(x,y)$ from observed $z_t(x,y)$. Hereinafter $g(x,y)$ and $b(x,y)$ will be referred to as the gain and offset, respectively, and the random noise term $N(x,y)$ will be ignored. Generally speaking, gain and offset are both a function of time, as they drift slowly along with the temperature change.

Two-point and one-point non-uniformity correction (NUC) are techniques commonly used to counteract fixed pattern noise. Two-point NUC solves for the two unknowns $g(x,y)$ and $b(x,y)$ for all the $(x,y)$ pixels in Equation 1 by processing two images taken of two distinct sources, e.g., two uniform heat sources in an infrared imaging system (i.e., a "hot" source and a "cold" source), or a "light" image and a "dark" image in an optical imaging system. Since two distinct sources are hard to maintain, camera manufacturers use one source to counteract offset drift in real time application, which is often referred to one-point NUC. In a one-point NUC, gain information is stored in a lookup table as a function of temperature, which can be loaded upon update. Given the gain, Equation 1 is solved to obtain the offset $b(x,y)$. Both calibration processes need to interrupt (reset) real time video operations, i.e., a calibration needs to be performed every few minutes to counteract the slow drift of the noise over time and ambient temperature. This is inappropriate for applications such as visual systems used on a battlefield or for video surveillance.

Scene-based NUC techniques have been developed to continuously correct FPA non-uniformity without the need to interrupt the video sequence in real time (reset). These techniques include statistical methods and registration methods. In certain statistical methods, it is assumed that all possible values of the true-scene pixel are seen at each pixel location, i.e., if a sequence of video images are examined, each pixel is assumed to have experienced a full range of values, say 20 to 220 out of a range of 0 to 255. Said another way, these statistical methods assume global constant statistics. Based on this assumption, the offset and gain are related to the temporal mean and standard deviation of the pixels at the pixel locations $(x,y)$. Global constant-statistics (CS) algorithms assume that the temporal mean and standard deviation of the true signals at each pixel is a constant over space and time. Furthermore, zero-mean and unity standard deviation of the true signals $s_t(x,y)$ are assumed, such that the gain and offset at each pixel are related to mean and standard deviation by the following equations:

$$b(x,y) \cong m(x,y) = \sum_{t=0}^{T-1} \frac{z_t(x,y)}{T}, \quad (2)$$

$$\sum_{x,y} \frac{b(x,y)}{T} = 0,$$

$$g(x,y) \cong \sigma(x,y) = \sqrt{\frac{\sum_{t=0}^{T-1}(z_t(x,y) - m(x,y))^2}{T-1}}, \quad (3)$$

$$\sum_{x,y} \frac{g(x,y)}{T} = 1,$$

where $m(x,y)$ is the temporal mean at $(x,y)$ and $\sigma(x,y)$ is the temporal standard deviation at $(x,y)$. T is the number of frames. Both mean and deviation can be obtained recursively. The estimated true signal at $(x,y)$ is expressed as:

$$\hat{s}_t(x,y) = \frac{z_t(x,y) - b(x,y)}{g(x,y)} \quad (4)$$

Registration methods assume that when images are aligned to each other, then aligned images have the same true-scene pixel at a given pixel location. Even if a scene is moving, when a pixel is aligned in all of the images, it will have the same value.

In general, statistical methods are not computationally expensive, and are easy to implement. But statistical methods based on global constant statistics requires many frames and the camera needs to move in such way as to satisfy the statistical assumption. Registration methods require fewer frames. However, they rely on accurate global motion estimation, and are computationally expensive. The assumption of the same true-scene pixel in the aligned image breaks down when the true signal response is affected by lighting change, automatic gain control (AGC) (which automatically adjusts the saturation, hue, brightness ) of the camera, and random noise.

Figure 1A:
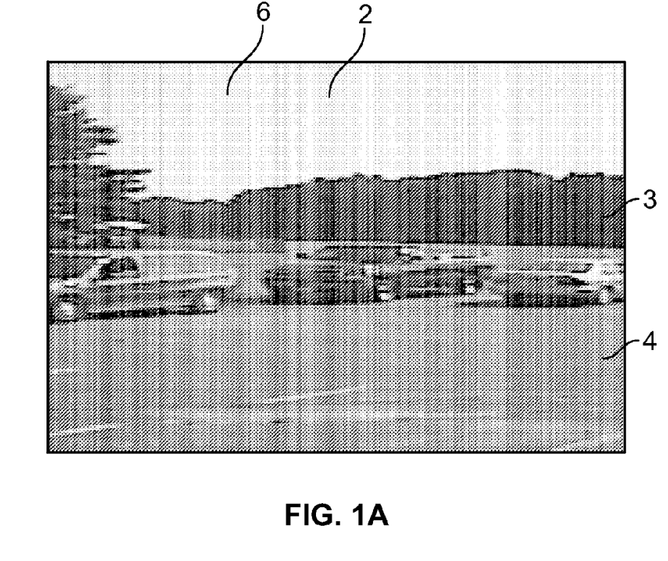
FIG. 1A is an image from a video sequence taken by a camera on a moving vehicle.
Figure 1B:
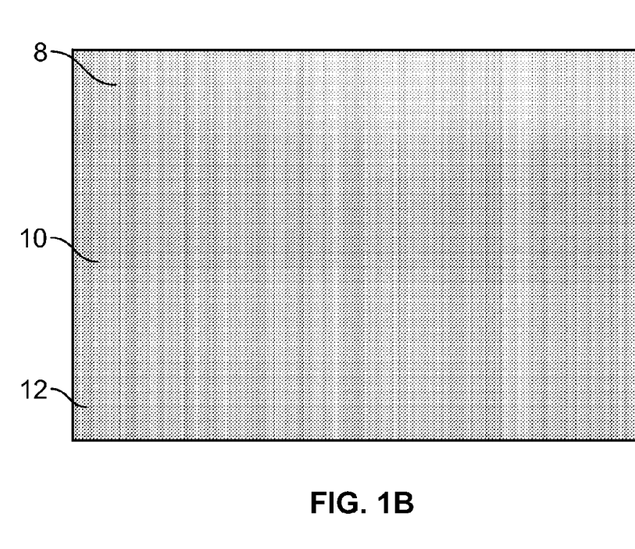
FIG. 1B is an image produced by averaging 2,000 frames in the sequence of FIG. 1.

A problem with both the statistical and registration approaches is that they tend to exhibit "ghosting" artifacts when a scene remains stationary or a camera freezes. A simple de-ghosting method is to detect changes in a sequence of images and to ignore a particular image if the change from the previous image is less than a threshold. "Ghosting" artifacts occur in processed images when the global constant-statistics assumption in statistical approach is broken, i.e., when the range of possible values of the true-scene pixel is different at various pixel locations. This means that, at one set of locations, the pixels experience a range of values, say 20 to 150, but at another set of locations in the same image, the pixels experience a different range of values, say 50 to 200. An illustrative example of the breakdown of the local constant statistics assumption producing "ghosting" artifacts is illustrated in FIGS. 1A and 1B, wherein a video sequence is taken by a camera on a moving vehicle. In FIG. 1A, a sample image shows part sky 2 and part trees 3, and part ground 4, overlayed with fixed pattern noise 6. The resulting average image of the sequence (2,000 frames) in FIG. 1B, assuming a global mean, shows an upper bright area 8, dark middle area 10, and a bottom gray area 12. Since a global constant statistical method assumes a constant mean, these spatial variation in the average image are interpreted as offset. This so-called "over-shoot" leaves a reverse ghost image.

Accordingly, what would be desirable, but has not yet been provided, is a statistical NUC method for eliminating fixed pattern noise in imaging systems that is not susceptible to "ghosting."

SUMMARY OF THE INVENTION

Disclosed is a method and system describing for eliminating fixed pattern noise in a video comprising a plurality of input images, comprising the steps of providing an initial gain image, an initial offset image, a predetermined pyramid level, and a filter of a predetermined level; setting one of the plurality of input images to a current image; calculating a temporary true scene image for the current image based on the initial gain image and the initial offset image; accumulating a temporal mean image and a temporal standard deviation image based on the calculated temporary true scene image; setting another of the plurality of images to the current image and repeating the setting, calculating, and accumulating steps until substantially all of the images of the plurality of images have been processed, otherwise further perform the steps of calculating a Gaussian mean image based on the accumulated temporal mean and calculating a Gaussian gain image based on the accumulated temporal standard deviation image; spectrum shaping the Gaussian mean image and the Gaussian gain image based on the predetermined pyramid level and the filter of a predetermined level, multiplying the spectrum shaped Gaussian gain image by the initial gain image to obtain a final gain image; and multiplying the spectrum shaped Gaussian mean image by the initial gain image and add the initial offset image to obtain a final offset image. The spectrum shaping of the Gaussian mean image can further comprise the steps of decomposing the Gaussian mean image into at least one Laplacian mean image and a low frequency Gaussian mean image corresponding to the predetermined pyramid level and the predetermined filter of a predetermined level; setting the low frequency Gaussian mean image to a constant DC mean image; and reconstructing the Gaussian mean image from the low frequency Gaussian mean image and the at least one Laplacian mean image by convoluting the at least one Laplacian mean image with a filter and adding the result to an upsampled low frequency Gaussian mean image. The spectrum shaping of the Gaussian gain image can further comprise the steps of decomposing the Gaussian gain image into at least one Laplacian gain image and a low frequency Gaussian gain image corresponding to the predetermined pyramid level and the predetermined filter of a predetermined level; setting the low frequency Gaussian gain image to a constant DC gain image; and reconstructing the Gaussian gain image from the low frequency Gaussian gain image and the at least one Laplacian gain image by convoluting the at least one Laplacian gain image with a filter and adding the result to an upsampled low frequency Gaussian gain image.

All pixels of the DC mean image can be set to 0 and all pixels of the DC gain image can be set to unity. The method can further comprise normalizing the final gain image to have a unity gain and normalize the final offset image to have a zero offset. The method can also comprise a static exclusion step to eliminating consideration of the current image if the summation of the absolute difference between the current image and an immediate preceding image is below a predetermined threshold. The true scene image sequence without noise can be recovered by subtracting final offset image from one of the plurality of input images and dividing the result by the final gain image; and repeating this step for another one of the plurality of input images until all of the images of the plurality of input images have been processed.

The above method can be repeated for subsequent sequences of images in the video by replacing the initial gain image and offset image of the next sequence by the final gain image and offset image calculated in the prior sequence. The initial gain image and the initial offset image can be derived from one of a one-point non-uniformity correction (NUC) technique, a two-point NUC or by "training" an initial gain image and offset image by assuming an initial gain set to unity and an initial offset set to zero and repeating the above method a predetermined number of times to derive a better final gain image and better final offset image, wherein final gain image from a previous iteration is set to the initial gain image for the next iteration and the final offset image for a previous iteration is set to the initial offset image for the next iteration.

The method described above can be incorporated into a system comprising a video camera for providing a plurality of images and a processor and a memory for performing the steps of the method. The memory and the processor are incorporated into the camera as a field programmable gate array, or the processor and the memory can be incorporated into a computer platform which post-processes the plurality of images from an external camera. The method can also be a program incorporated into a computer-readable medium.

DETAILED DESCRIPTION OF THE INVENTION

The following embodiments are intended as exemplary, and not limiting. In keeping with common practice, figures are not necessarily drawn to scale.

The present invention is a statistical method that is based on local constant-statistics instead of a global constant-statistics, i.e., temporal signal variations in a sequence of images are not constant for all pixels, but is constant for a given pixel and its local neighbors in a block of pixels. To separate out the pattern noise from the spatial variations of the temporal average of a sequence of images, wavelet transforms using Laplacian pyramids are used to decompose the sequence of images into its spectral components and then spectrum shaping is applied.

The calculation of gain and offset assuming global constant statistics can be developed further. Starting with the global constant statistics Equations (1) and (2), mean and offset can be normalized to maintain a zero-mean offset and unity gain. The zero-mean offset and unity gain can be re-written in terms of temporal mean $m(x,y)$ and standard deviation $\sigma(x,y)$ and the spatial average of the temporal mean $<m>$ and deviation $<\sigma>$:

$$g(x,y) = \sigma(x,y)/<\sigma>, \quad (5)$$

$$b(x,y) = m(x,y) - g(x,y) \cdot m_s(x,y), \quad (6)$$

where $m_s$ is the temporal mean of a true signal in a sequence of images. (Temporal mean and deviation are the time varying mean and standard deviation of a given pixel at $(x,y)$ in an image, while spatial mean and deviation are the mean and standard deviation over all the pixels in a sequence of images). To satisfy the zero-mean offset condition under the global constant statistics, the spatial average $<m_s>$ can be obtained in terms of $<m>$ and $<g>$:

$$<m_s> = \frac{<m>}{<g>}, \quad (7)$$

Next, the initial gain and offset, designated as $(g_l, b_l)$, can be obtained by a 2-point calibration or a scene-based NUC, or simply set to identity if not calibrated. If the initial NUC applies to the $n^{th}$ image sequence (e.g., sequence frames 1-2000 for sequence 1, 2001-4000 for sequence 2, sequence n, etc.) then:

$$\frac{z_n(x,y) - b_l}{g_l} = g_n^t(x,y) \cdot s_n(x,y) + b_n^t(x,y), \quad (8)$$

where $g'_n(x,y)$ and $b'_n(x,y)$ are the gain and offset, respectively, of the $n^{th}$ sequence when $g_l$ and $b_l$ are given. The estimated gain and offset that apply to the original response signals, i.e., the cascaded gain and offset, can be calculated by the following equations:

$$\hat{g}_n(x,y) = g'_n(x,y) \cdot g_l(x,y), \quad (9)$$

$$\hat{b}_n(x,y) = g_l(x,y) \cdot b'_n(x,y) + b_l(x,y), \quad (10)$$

$(\hat{g}(x,y), \hat{b}(x,y))$ in Eq. (9) and (10) reflects the noise drift from the initial calibration in sequence n. A new gain and offset can be used to correct the input signals of the next sequence. If $(\hat{g}(x,y), \hat{b}(x,y))$ drifts far away from the initial $(g_l, b_l)$, some rules, generally defined by experimentation, can be defined to update $(g_l, b_l)$.

In Eq. (5), (6) and (7), the temporal mean and deviation represents the offset and gain that reflect fixed pattern noise only if (a) the range of true scene signal is the same at each pixel in the image and (b) temporal distribution of these pixels are the same. This is the global constant statistic assumption. In reality, this is rarely the case. The gain and offset obtained from Equation (5), (6) and (7), contains the fixed pattern noise from the imager and the uneven statistical distribution of the scene, which in most cases breaks the global constant statistics assumption that the true signal statistics is constant over all the pixels.

A better gain and offset estimation can be obtained based on a local constant statistics assumption. Local constant statistics assumes that an equal range and distribution of true scene signals is seen in a block around each pixel location. This implies, $$F \otimes m_s(x,y) \approx m_s(x,y), \quad (11)$$

where F is a filter or a local operator around $(x,y)$, and $\otimes$ represents the convolution operation. The filter size is determined by the frequency response of the fixed pattern noise and the nature of the scene comprising the image sequence. Appropriate filters that can be used are described hereinbelow. Furthermore, if it is assumed that the change of gain is small, then $$F \otimes (gm_s) \approx (F \otimes g) \cdot m_s = (F \otimes g) \cdot (<m_s> + \delta m_s), \quad (12)$$

which leads to a first order approximation:

$$\delta m_s = \frac{F \otimes m}{F \otimes g} - <m_s>, \quad (13)$$

and using Eq. (6), $$b = m - g<m_s> - g\delta m_s, \quad (14)$$

where $<m_s>$ is obtained from Eq. (7), and $\delta m_s$ represents the spatial variations caused by the signals in the average image. It is further assumed that the offset, b, has a much larger spatial variation compared to $m_s$, which is $\delta b >> \delta m_s$. Given these two assumptions, a wavelet method (transform) can be used to decompose the offset image into a Laplacian pyramid, and the low frequency image derived from such a representation, called the Gaussian image, can be reshaped such that $\delta m_s$ can be effectively removed from the offset. Similarly, spectrum shaping can be applied to the low frequency Gaussian image of the wavelet transform of g, gain, to obtain a better estimate of gain since the gain image in Eq. (5) also is a function of the distribution of the signals.

a. Spectrum Shaping on Gain

From Equation (5), the gain image is obtained from the ratio of the local standard deviation over the spatial average of the deviation. Eq. (5) is rewritten, in wavelet terminology, as an equation for a Gaussian image:

$$G_0{}^g = g)(x,y) = \sigma(x,y)/<\sigma>, \quad (15)$$

$G_0{}^g$ can be decomposed into a multispectral and multiscale representation, or a Laplacian pyramid representation, where each subband of the pyramid contains a certain frequency band of the image:

$$G_0{}^g = L_0 \oplus L_1 \oplus L_2 \oplus \ldots \oplus L_{n-1} \oplus G_n, \quad (16)$$

Figure 2:
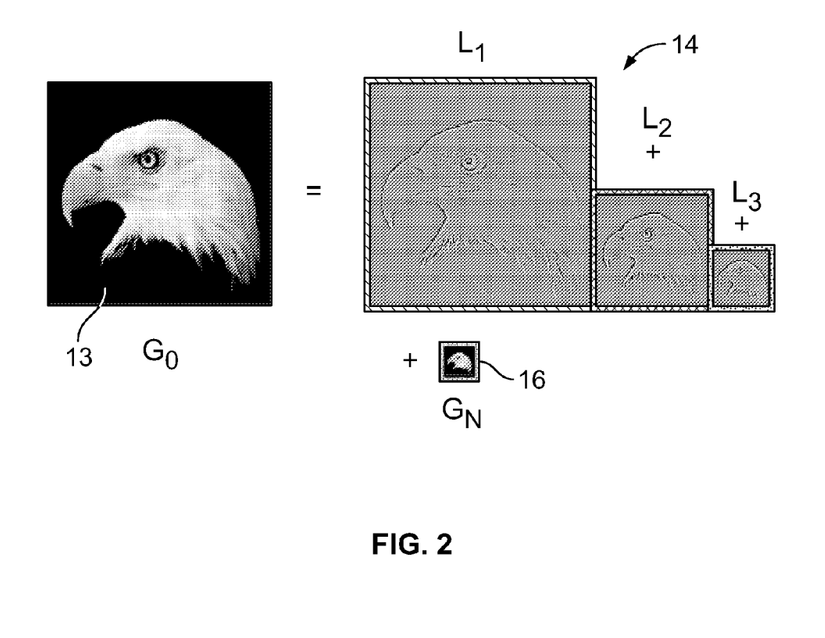
FIG. 2 is a sequence of images comprising an initial Gaussian image which is decomposed into a plurality of Laplacian images and a low frequency Gaussian image of a Laplacian pyramid representation.
Figure 3:
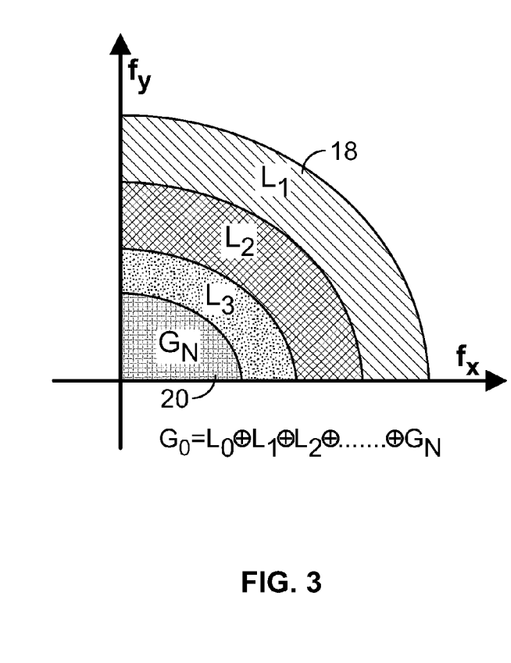
FIG. 3 depicts a wavelet transform representation of the images of FIG. 2.

An initial Gaussian image decomposed into a plurality of Laplacian images of a Laplacian pyramid representation is depicted in FIG. 2. The wavelet transform representation of these images is depicted in FIG. 3. In the frequency domain, a Gaussian image 13 is composed of Laplacian images 14 at different scales and a low frequency Gaussian image 16. FIG. 3 shows these images correspond to different frequency bands. The bulk of the fixed pattern noise is contained in the higher frequency bands 18, while the ghosting effects are generally confined to the low frequency Gaussian image band 20. The Gaussian image at level i+1 is obtained from level i by smoothing with a filter F and decimating by half.

$$G_{i+1} = (F \otimes G_i) \downarrow 2, \quad (17)$$

and the Laplacian image at level i is the convolution of (1−F) on the Gaussian image:

$$L_i = (1-F) \otimes G_i, \quad (18)$$

The Laplacian image at level 0 contains the highest frequency band of the image, and higher levels contain lower frequency bands. For local constant statistics to hold true, the local low frequency Gaussian image, $G_n$, can be set to a constant DC image instead of being time varying, preferably identity for all pixels in the image. This spectral shaping operation removes the uneven distribution of signals from Eq. (15). By summing up the subbands, the Gaussian image $G_0$ can be reconstructed as:

$$g \approx G_{est} = L_0 \oplus L_1 \oplus L_2 \oplus \ldots \oplus L_{n-1} \oplus DC, \quad (19)$$

b. Spectrum Shaping on Offset

As discussed above, offset b can be obtained from Eq. (14), where the estimate of gain is obtained from Eq. (19). Similar to the gain image, spectrum shaping can be applied to obtain b. Since it is assumed that b has much higher spatial frequency components than does $\delta m_s$ and therefore $\delta b >> \delta m_s$, the $\delta m_s$-term can be dropped from Eq. (14), wherein a Gaussian image $G_0{}^b$ can be obtained as follows:

$$G_0{}^b = b + g\delta m_s = m - g<m_s>, \quad (20)$$

Like $G_0{}^g$, $G_0{}^b$ can be decomposed into a multispectral and multiscale representation, or a Laplacian pyramid representation, where each subband of the pyramid contains a certain frequency band of the image:

$$G_0{}^b = L_0 \oplus L_1 \oplus L_2 \oplus \ldots \oplus L_{n-1} \oplus G_n, \quad (21)$$

Similar to the analysis for gain, the Laplacian image at level 0 for offset contains the highest frequency band of the offset image, and higher levels contain lower frequency bands. The assumption of the spatial variation of higher b compared to $m_s$ suggests that b exists in most of the Laplacian subbands, while $\delta m_s$ is mostly contained in $G_n$. Therefore, $G_n$ can be set to a constant DC image, preferably to 0 for all pixels in the image. This spectral shaping operation removes the $\delta m_s$ term from Eq. (20). By summing up the subbands, we can reconstruct the Gaussian image $G_0$:

$$b \approx G_{est} = L_0 \oplus L_1 \oplus L_2 \oplus \ldots \oplus L_{n-1} \oplus DC, \quad (22)$$

Figure 4:
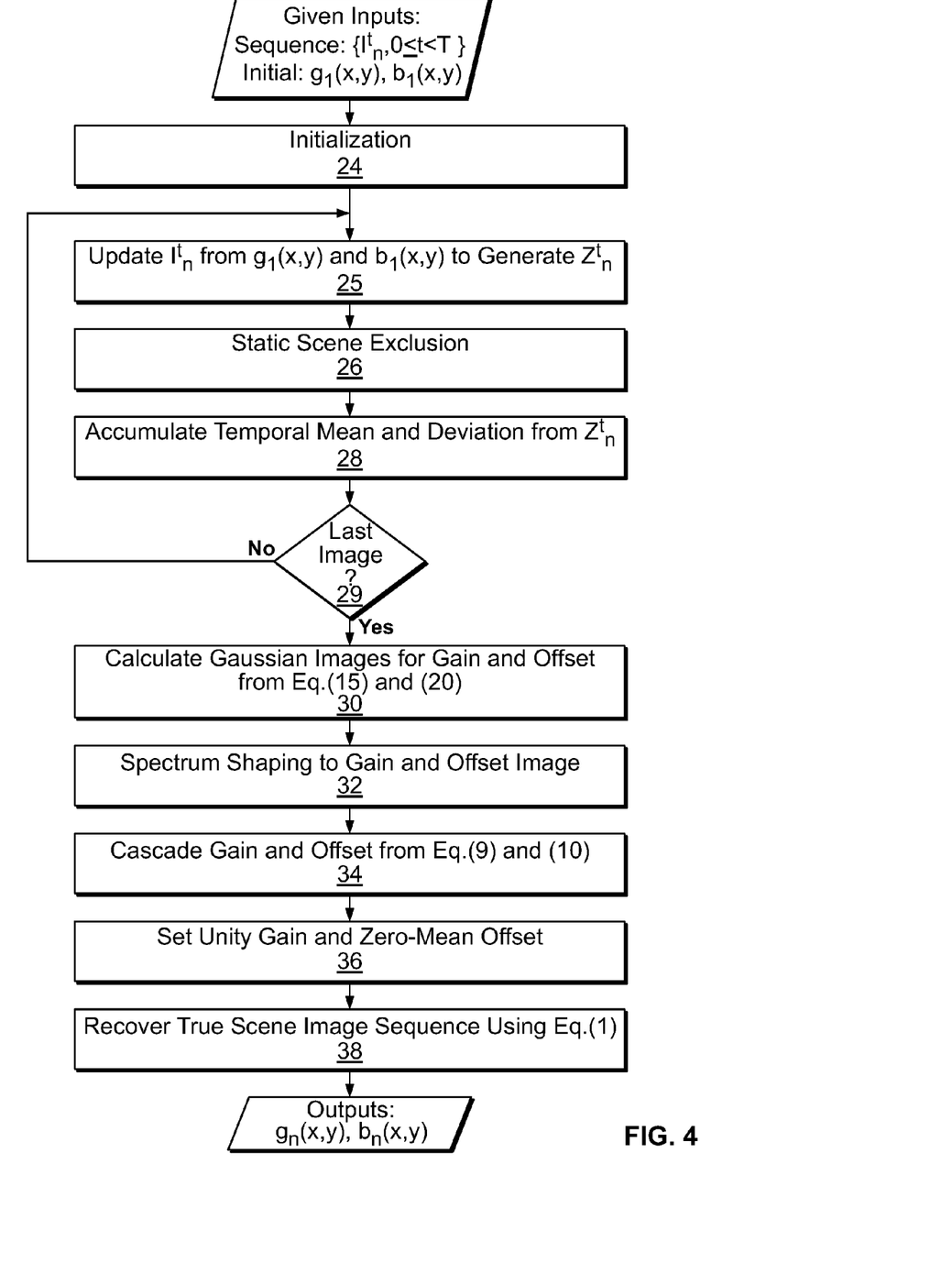
FIG. 4 is a flow chart depicting a local constant statistics algorithm, constructed in accordance with an embodiment of the present invention.

Referring now to FIG. 4, the LCS algorithm can be described as follows. At step 24, initialize Equation 1 with a pair of initial reference NUC coefficients $g_I$, $b_I$. At step 25, given a sequence of input images: $I_n{}^0, I_n{}^1, I_n{}^2, \ldots I_n{}^t, \ldots I_n{}^{T-2}, I_n{}^{T-1}$, and a pair of initial reference NUC coefficients $g_I$, $b_I$, each image in the sequence of length T is initially corrected by the coefficients by substituting the $I_n{}^t$ for $z_t(x,y)$ in Equation 1 to obtain $$Z_n^t(x,y) = \frac{I_n^t(x,y) - b_I(x,y)}{g_I(x,y)}$$

Since $Z_n{}^t(x,y)$ may contain noise after initial correction, it is still treated as the original input images for the rest of the discussion. Therefore, $Z_n{}^t(x,y)$ and $z_n{}^t(x,y)$ can be mixed/used without any confusion.

Optionally, at step 26, in order to reduce the ghosting effect caused by a static scene, the sequence of images $Z_n{}^t$ can be subjected to a static scene exclusion function. The summation of the absolute difference (SAD) between two consecutive images $Z_n{}^t$ and $Z_n{}^{t+1}$ is checked and if the summation is below a predetermined threshold then the second frame $Z_n{}^{t+1}$, is excluded, i.e., there is little change of the current image compare to the previous image. The updated input images are defined as $\{Z_n{}^t\}$. At step 28, the temporal mean and standard deviation at each pixel of all the images in the sequence are accumulated respectively by the following recursive formula:

$$m_t(x,y) = \begin{cases} Z_n^0, & t=0 \\ \dfrac{Z_n^t + t \cdot m_{t-1}(x,y)}{t+1}, & 0 < t < T, \end{cases} \quad (23)$$

$$\sigma_t(x,y) = \begin{cases} Z_n^0, & t=0 \\ \sqrt{\dfrac{\text{sum}(Z_n^t \cdot Z_n^t) - (t+1) \cdot m_t(x,y) \cdot m_t(x,y)}{t}}, & 0 < t < T \end{cases} \quad (24)$$

where $\text{sum}(Z_n{}^t \cdot Z_n{}^t) = \text{sum}(Z_n{}^{t-1} \cdot Z_n{}^{t-1}) + Z_n{}^t \cdot Z_n{}^t$, t>0.

At step 29, if this is not the last image $I_n{}^{T-1}$ in the sequence, then steps 24-29 are repeated, otherwise, at step 30, the Gaussian images for gain and offset, $g \approx G_0{}^g$ and $b \approx G_0{}^g$, are calculated using the accumulated mean $m_t(x,y)$ and standard deviation $\sigma_t(x,y)$ using Eq. (15) and (20), respectively. At step 32, the obtained Gaussian images are then spectrum shaped as discussed above according to Equations (19) and (22) to get a better estimate of both gain and offset, respectively. Note that the filter F needs to be chosen at this time to obtain Laplacian images $L_i$. The size of the filter depends on the noise level; the pyramid level depends on the noise level and the frequency characteristics of the fixed pattern noise. The filter F is determined by the point spread function (PSF) of an FPA sensor type of a given manufacturer. If manufacturer information is not available, then F is assumed to be a Gaussian filter, which is defined in M. Irani and S. Peleg, "Motion Analysis for Image Enhancement: Resolution, Occlusion, and Transparency," *Journal of Visual Comm. and Image Repre.*, Vol. 4, pp. 324-335, 1993. In a preferred embodiment, a 5×5 filter or a 9×9 filter can be used. The 5×5 filter is shown below:

$$F = \frac{1}{256}\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}, \text{etc.}$$

To reconstruct a spectrum shaped Gaussian gain and offset image, the Laplacian image at level n is convolved with a filter, added to itself, and then this result is added to an up-sampled Gaussian image from the next level n+1. This constructs the new Gaussian image at level n. The reconstructed Gaussian image at level n is written as:

$$G_n = (1+F) \otimes L_n + 4F \otimes [G_{n+1}] \uparrow 2, \quad (25)$$

where F is the filter, $L_n$ is the Laplacian image at level n, and $G_{n+1}$ is the Gaussian image at level n+1.

At step 34, since the gain and offset are computed in terms of the updated image sequence, they need to be cascaded according to equations (9) and (10) so that they can be applied to the original images, At step 36, optionally, the gain and offset image obtained so far may need to be normalization to ensure unity gain and zero-mean offset conditions. The outputs of the Local Constant Statistics algorithm are final gain and offset for the sequence $g_n(x,y)$ and $b_n(x,y)$, respectively. At step 38, equation (1) can then be used with the newly calculated gain and offset images $g_n(x,y)$ and $b_n(x,y)$ to recover the true scene image $\{s_t(x,y)$ without noise:

$$s_t(x, y) = \frac{I_n^t(x, y) - b_n(x, y)}{g_n(x, y)} \quad (26)$$

Figure 5:
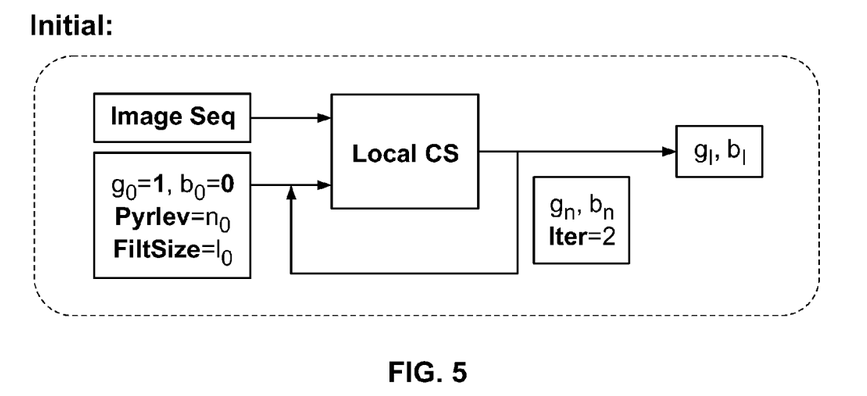
FIG. 5 is a block diagram depicting the method of obtaining the initial gain and offset from the LCS algorithm of FIG. 4 assuming only two iterations.

There are several ways to obtain the initial reference gain and offset $g_I(x,y)$ and $b_I(x,y)$ for use in the Local Constant Statistics (LCS) algorithm: (1) Calibration from the manufacturer based on a static two-point calibration. The calibration is stored as a function of temperature in memory. (2) Storage of gain information as the function of temperature in memory. The offset is generated in real-time based on the one-point calibration. (3) Generation of gain and offset from LCS algorithm itself. Obtaining the initial gain and offset from the LCS algorithm is illustrated pictorially in FIG. 5. Initially, an identity gain $g_0$ and constant zero-offset $b_0$ are fed to the LCS algorithm along with a first image sequence. The filter size $l_0$ and the pyramid level $n_0$ are chosen empirically to be large enough to ensure that most of the fixed pattern noise can be eliminated by the initial calculation of gain and offset using the LCS. The LCS algorithm generates a new gain and offset $g_n$, $b_n$ which are themselves fed back to the LCS algorithm for a second iteration. This feedback process is repeated a predetermined number of times. In most cases, a few iterations through the LCS algorithm are enough to generate an initial gain and offset to be used for subsequent image sequences. This reference gain and offset can apply to all successive image sequences unless there is a need to recalculate them, which may occur if temperature drifts by a large amount over a short period of time. In such a situation, the reference gain and offset can be re-established using the LCS algorithm with feedback as discussed above. Since the LCS function does not totally remove the high frequency information remained in the average of a sequence of images (scene), the number of iterations should be limited so as to not enhance fixed pattern noise.

Figure 6:
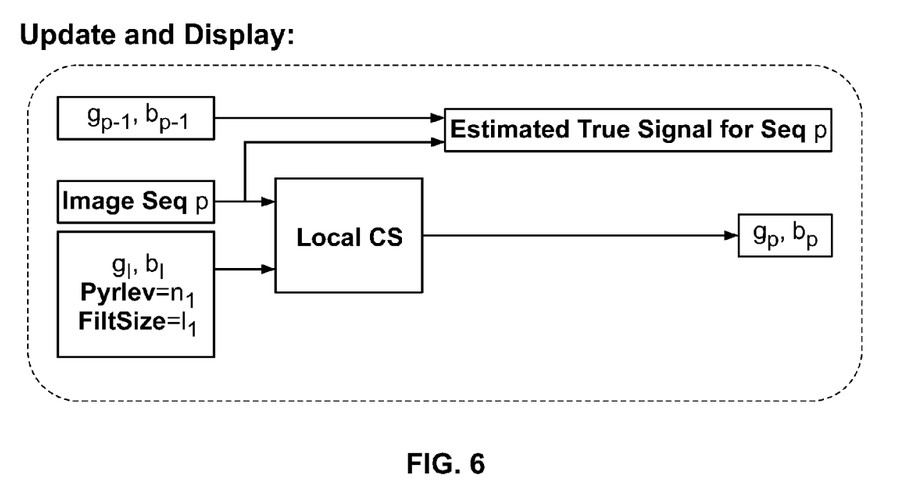
FIG. 6 is a block diagram depicting the method of obtaining the gain and offset for the sequence p from the LCS algorithm of FIG. 4 given the reference gain $g_l$ and offset $b_l$.

Obtaining the gain and offset for a series of sequences p from the LCS algorithm given the reference gain $g_I$ and offset $b_I$ is illustrated pictorially in FIG. 6. The gain $g_{p-1}$ and offset $b_{p-1}$ are fed into equation (25) along with the present image sequence to estimate the true signal sequence p. Then, gain and offset are updated by feeding the image sequence p to the LCS algorithm along with a set of initial parameters: gain $g_I$ and offset $b_I$ calculated in FIG. 5, a pyramid level $n_I$ and a filter size $l_I$. Note that the initial gain and offset are retained through subsequent sequences, and that the calculated gain $g_p$ and offset $b_p$ are not fed back to the LCS algorithm iteratively. Since the reference gain $g_I$ and offset $b_I$ account for most of the fixed pattern noise of the system, the accumulated statistical mean and deviation of the corrected images compensates for any change caused by temperature variation and noise. Because the change is relatively small, a smaller filter size and smaller pyramid level compared to that used in the initial gain and offset calculations of FIG. 5 can be used to reduce any influence caused by the high-frequency spatial variation from the signals.

Figure 7:
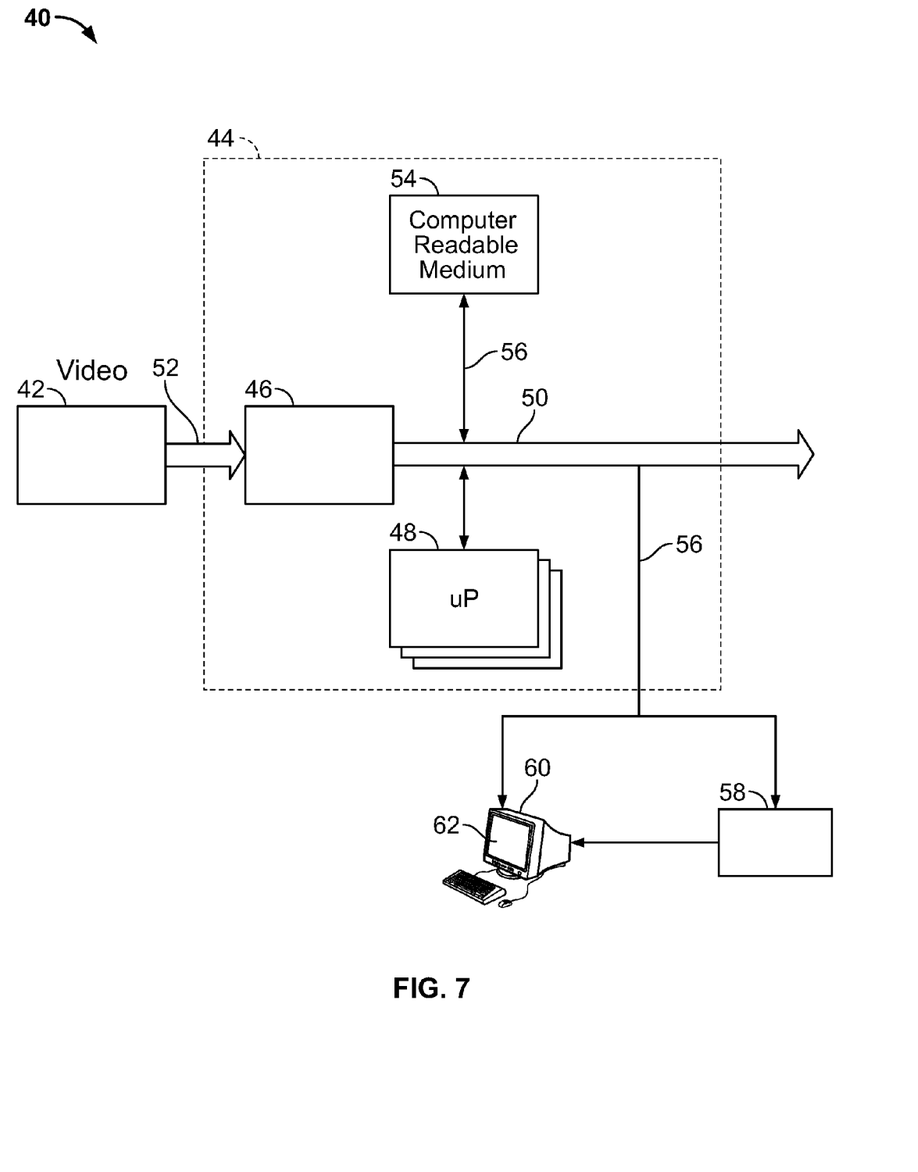
FIG. 7 is block diagram of an offline video processing system employing the method of the present invention.

In some embodiments, the LCS algorithm can be incorporated directly into the hardware of a digital video camera system by means of a field programmable gate array (FPGA) or ASIC, or a microcontroller equipped with RAM and/or flash memory to process video sequences in real time. Alternatively, sequences of video can be processed offline using a processor and a computer-readable medium incorporating the LCS algorithm as depicted in the system 40 of FIG. 7. The system 40 can include a digital video capture system 42 and a computing platform 44. The digital video capturing system 42 processes streams of digital video, or converts analog video to digital video, to a form which can be processed by the computing platform 44. The digital video capturing system may be stand-alone hardware, or cards 46 such as Firewire cards which can plug-in directly to the computing platform 44. The computing platform 44 may include a personal computer or work-station (e.g., a Pentium-M 1.8 GHz PC-104 or higher) comprising one or more processors 48 which includes a bus system 50 which is fed by video data streams 52 via the processor or directly to a computer-readable medium 54. The computer readable medium 54 can also be used for storing the instructions of the system 40 to be executed by the one or more processors 48, including an operating system, such as the Windows or the Linux operating system. The computer readable medium 54 can include a combination of volatile memory, such as RAM memory, and non-volatile memory, such as flash memory, optical disk(s), and/or hard disk(s). In one embodiment, the non-volatile memory can include a RAID (redundant array of independent disks) system configured at level 0 (striped set) that allows continuous streaming of uncompressed data to disk without frame-drops. In such a system, a processed video data stream 56 can be stored temporarily in the computer readable medium 54 for later output. In alternative embodiments, the processed video data stream 56 can be fed in real time locally or remotely via an optional transmitter 58 to a monitor 60. The monitor 60 can display processed video data stream 56 showing a scene 62.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed:

1. A scene-based non-uniformity correction method employing local constant statistics for eliminating fixed pattern noise in a video comprising a plurality of input images, comprising the steps of:
   (a) providing an initial gain image, an initial offset image, a predetermined pyramid level, and a filter of a predetermined level;
   (b) setting one of the plurality of input images to a current image;
   (c) calculating a temporary true scene image for the current image based on the initial gain image and the initial offset image;
   (d) accumulating a temporal mean image and a temporal standard deviation image based on the calculated temporary true scene image;
   (e) setting another of the plurality of images to the current image and repeat steps (c) -(e) until substantially all of the images of the plurality of images have been processed, otherwise further performing the steps of:
   (f) calculating a Gaussian mean image based on the accumulated temporal mean and calculating a Gaussian gain image based on the accumulated temporal standard deviation image;
   (g) spectrum shaping the Gaussian mean image and the Gaussian gain image based on the predetermined pyramid level and the filter of the predetermined level;
   (h) multiplying the spectrum shaped Gaussian gain image by the initial gain image to obtain a final gain image; and
   (i) multiplying the spectrum shaped Gaussian mean image by the initial gain image and add the initial offset image to obtain a final offset image.

2. The method of claim 1, wherein the step of spectrum shaping the Gaussian mean image and the Gaussian gain image further comprises the steps of:
   decomposing the Gaussian mean image into at least one Laplacian mean image and a low frequency Gaussian mean image corresponding to the predetermined pyramid level and the predetermined filter of a predetermined level;
   setting the low frequency Gaussian mean image to a constant DC mean image;
   reconstructing the Gaussian mean image from the low frequency Gaussian mean image by convoluting the at least one Laplacian mean image with a filter and adding the result to an upsampled low frequency Gaussian mean image;
   decomposing the Gaussian gain image into at least one Laplacian gain image and a low frequency Gaussian gain image corresponding to the predetermined pyramid level and the predetermined filter of a predetermined level;
   setting the low frequency Gaussian gain image to a constant DC gain image; and
   reconstructing the Gaussian gain image from the low frequency Gaussian gain image by convoluting the at least one Laplacian gain image with a filter and adding the result to an upsampled low frequency Gaussian gain image.

3. The method of claim 2, further comprising the steps of setting all pixels of the DC mean image to 0 and setting all pixels of the DC gain image to unity.

4. The method of claim 1, further comprising the step of normalizing the final gain image to have a unity gain and normalize the final offset image to have a zero offset.

5. The method of claim 1, further comprising the step of eliminating consideration of the current image after step (c) and before step (d) if the summation of the absolute difference between the current image and an immediate preceding image is below a predetermined threshold.

6. The method of claim 1, further comprising the step of:
   recovering the true scene image sequence without noise by subtracting final offset image from one of the plurality of input images and dividing the result by the final gain image; and
   repeating the above step for another one of the plurality of input images until substantially all of the images of the plurality of input images have been processed.

7. The method of claim 1, further comprising the step of repeating steps (a)-(i) for a second plurality of images from the video, wherein the initial gain image is replaced by the final gain image calculated in the prior step (h) and the an initial offset image is replaced by the final offset image calculated in the prior step (i).

8. The method of claim 1, wherein the initial gain image and the initial offset image are derived from one of a one-point non-uniformity correction (NUC) technique and a two-point NUC.

9. The method of claim 1, wherein the initial gain image and the initial offset image are derived from a final gain image and a final offset images created by the execution of steps (a)-(i) assuming an initial gain set to unity and an initial offset set to zero.

10. The method of claim 1, wherein steps (a)-(i) are repeated a predetermined number of times to derive a better final gain image and better final offset image, wherein final gain image from a previous iteration is set to the initial gain image for the next iteration and the final offset image for a previous iteration is set to the initial offset image for the next iteration.

11. The method of claim 1, wherein the temporary true scene image of step (c) is calculated by subtracting the initial offset image from current image and dividing the result by the initial gain image.

12. The method of claim 1, wherein the temporal mean image and the temporal standard deviation image of step (d) are accumulated by applying the recursive formulas $$m_t(x, y) = \begin{cases} Z_n^0, & t = 0 \\ \dfrac{Z_n^t + t \cdot m_{t-1}(x, y)}{t + 1}, & 0 < t < T, \end{cases}$$

$$\sigma_t(x, y) = \begin{cases} Z_n^0, & t = 0 \\ \sqrt{\dfrac{\text{sum}(Z_n^t \cdot Z_n^t) - (t + 1) \cdot m_t(x, y) \cdot m_t(x, y)}{t}}, & 0 < t < T \end{cases}$$

where sum $(Z_n^t \cdot Z_n^t)$=sum $(Z_n^{t-1} \cdot Z_n^{t-1})+Z_n^t \cdot Z_n^t$, t>0, $m_t(x,y)$ is the accumulated mean image at image number t and pixel position (x,y), $\sigma_t(x,y)$ is the temporal standard deviation image at image number t and pixel position (x,y), T is the number of images in the plurality of images, n is the $n^{th}$ plurality of images, and $Z_n^t$ is the temporary true scene image.

13. The method of claim 1, wherein the step of calculating the Gaussian mean image comprises the step of dividing the temporal standard deviation image of the plurality of images by the spatial average of the temporal standard deviation image of the plurality of images, and wherein the step of calculating the Gaussian gain image comprises the step of subtracting from the temporal mean image of the plurality of images the product of the temporal gain image of the plurality of images and the spatial average of the temporal mean image of the plurality of images divided by the spatial average of the temporal standard deviation image of the plurality of images.

14. A system for eliminating fixed pattern noise in a video comprising a plurality of images, comprising:
a video camera for providing the plurality of images; and
a processor and a memory for performing the steps of:
  (a) providing an initial gain image, an initial offset image, a predetermined pyramid level, and a filter of a predetermined level;
  (b) setting one of the plurality of input images to a current image;
  (c) calculating a temporary true scene image for the current image based on the initial gain image and the initial offset image;
  (d) accumulating a temporal mean image and a temporal standard deviation image based on the calculated temporary true scene image;
  (e) setting another of the plurality of images to the current image and repeat steps (c)-(e) until substantially all of the images of the plurality of images have been processed, otherwise further performing the steps of:
  (f) calculating a Gaussian mean image based on the accumulated temporal mean and calculating a Gaussian gain image based on the accumulated temporal standard deviation image;
  (g) spectrum shaping the Gaussian mean image and the Gaussian gain image based on the predetermined pyramid level and the filter of the predetermined level;
  (h) multiplying the spectrum shaped Gaussian gain image by the initial gain image to obtain a final gain image; and
  (i) multiplying the spectrum shaped Gaussian mean image by the initial gain image and add the initial offset image to obtain a final offset image.

15. The system of claim 14, wherein the step of spectrum shaping the Gaussian mean image'and the Gaussian gain image further comprises the steps of:
decomposing the Gaussian mean image into at least one Laplacian mean image and a low frequency Gaussian mean image corresponding to the predetermined pyramid level and the predetermined filter of a predetermined level;
setting the low frequency Gaussian mean image to a constant DC mean image;
reconstructing the Gaussian mean image from the low frequency Gaussian mean image by convoluting the at least one Laplacian mean image with a filter and adding the result to an upsampled low frequency Gaussian mean image;
decomposing the Gaussian gain image into at least one Laplacian gain image and a low frequency Gaussian gain image corresponding to the predetermined pyramid level and the predetermined filter of a predetermined level;
setting the low frequency Gaussian gain image to a constant DC gain image; and
reconstructing the Gaussian gain image from the low frequency Gaussian gain image by convoluting the at least one Laplacian gain image with a filter and adding the result to an upsampled low frequency Gaussian gain image.

16. The system of claim 15, wherein the processor and the memory further perform the step of setting all pixels of the DC mean image to 0 and setting all pixels of the DC gain image to unity.

17. The system of claim 14, wherein the processor and the memory further perform the step of:
recovering the true scene image sequence without noise by subtracting final offset image from one of the plurality of input images and dividing the result by the final gain image; and
repeating the above step for another one of the plurality of input images until substantially all of the images of the plurality of input images have been processed.

18. The system of claim 14, wherein the memory and the processor are incorporated into the camera.

19. The system of claim 18, wherein the processor and the memory are implemented as a field programmable gate array.

20. The system of claim 14, wherein the processor and the memory are incorporated into a computer platform which post-processes the plurality of images from an external camera.

21. A computer-readable medium for storing computer instructions for eliminating fixed pattern noise in a video comprising a plurality of images that, when executed on a computer, enable a processor-based system to:
  (a) provide an initial gain image, an initial offset image, a predetermined pyramid level, and a filter of a predetermined level;
  (b) set one of the plurality of input images to a current image;
  (c) calculate a temporary true scene image for the current image based on the initial gain image and the initial offset image;
  (d) accumulate a temporal mean image and a temporal standard deviation image based on the calculated temporary true scene image;
  (e) set another of the plurality of images to the current image and repeat (c)-(e) until substantially all of the images of the plurality of images have been processed, otherwise
  (f) calculate a Gaussian mean image based on the accumulated temporal mean and calculating a Gaussian gain image based on the accumulated temporal standard deviation image;
  (g) spectrum shape the Gaussian mean image and the Gaussian gain image based on the predetermined pyramid level and the filter of a predetermined level;
  (h) multiply the spectrum shaped Gaussian gain image by the initial gain image to obtain a final gain image; and
  (i) multiply the spectrum shaped Gaussian mean image by the initial gain image and add the initial offset image to obtain a final offset image.

22. The computer-readable medium of claim 21, wherein in (g), the processor-based system is further enabled to:
decompose the Gaussian mean image into at least one Laplacian mean image and a low frequency Gaussian mean image corresponding to the predetermined pyramid level and the predetermined filter of a predetermined level;
set the low frequency Gaussian mean image to a constant DC mean image;
reconstruct the Gaussian mean image from the low frequency Gaussian mean image by convoluting the at least one Laplacian mean image with a filter and adding the result to an upsampled low frequency Gaussian mean image;

decompose the Gaussian gain image into at least one Laplacian gain image and a low frequency Gaussian gain image corresponding to the predetermined pyramid level and the predetermined filter of a predetermined level;

set the low frequency Gaussian gain image to a constant DC gain image; and reconstruct the Gaussian gain image from the low frequency Gaussian gain image by convoluting the at least one Laplacian gain image with a filter and adding the result to an upsampled low frequency Gaussian gain image.

23. The computer-readable medium of claim 22, wherein the processor-based system is further enabled to set all pixels of the DC mean image to 0 and set all pixels of the DC gain image to unity.

24. The computer-readable medium of claim 21, wherein the processor-based system is further enabled to:

(j) recover the true scene image sequence without noise by subtracting final offset image from one of the plurality of input images and dividing the result by the final gain image; and (k) repeat (j) for another one of the plurality of input images until all of the images of the plurality of input images have been processed.

* * * * *